US007362259B2

(12) United States Patent
Gottwald

(10) Patent No.: US 7,362,259 B2
(45) Date of Patent: Apr. 22, 2008

(54) RADAR ANTENNA ARRAY

(75) Inventor: Frank Gottwald, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 10/821,546

(22) Filed: Apr. 8, 2004

(65) Prior Publication Data

US 2004/0257265 A1 Dec. 23, 2004

(30) Foreign Application Priority Data

Apr. 11, 2003 (DE) ................................ 103 16 637

(51) Int. Cl.
*H01Q 21/06* (2006.01)
*H01Q 9/04* (2006.01)
*G01S 13/93* (2006.01)

(52) U.S. Cl. ........................ 342/70; 342/159; 342/175; 342/367; 343/711; 343/824; 343/700 MS

(58) Field of Classification Search .................. 342/27, 342/28, 59, 70–72, 368–377, 118, 159, 134–144, 342/175; 180/167–169; 701/300, 301; 343/711–717, 343/700 MS, 897, 824
See application file for complete search history.

(56) References Cited

U.S. PATENT DOCUMENTS 2,690,555 A * 9/1954 Baynard ...................... 342/71
2,841,782 A * 7/1958 McIlwain .................... 342/71
3,337,866 A * 8/1967 Gisonno ...................... 342/71
3,735,398 A * 5/1973 Ross .......................... 180/169
3,750,169 A * 7/1973 Strenglein .................... 342/72
3,772,690 A * 11/1973 Nations ....................... 342/72
3,778,823 A * 12/1973 Sato et al. .................... 342/72
3,858,205 A * 12/1974 Ross ........................... 342/72
5,598,163 A 1/1997 Cornic et al.
5,781,157 A 7/1998 Laird

FOREIGN PATENT DOCUMENTS

| | | |
|---|---|---|
| DE | 44 12 77 | 3/1927 |
| DE | 44 12 770 | 10/1995 |
| WO | WO 99/42856 | 8/1999 |
| WO | WO 02/15334 | 2/2002 |

OTHER PUBLICATIONS

"Microstrip Patch Antenna", no author listed; no date listed; copyright 2006; on the Internet at emtalk.com.*

* cited by examiner

*Primary Examiner*—Bernarr E. Gregory

(57) ABSTRACT

For suppressing secondary lobes in pulsed radar systems, the antenna characteristics of the transmitting antenna and the receiving antenna are designed so that the dominant secondary lobes appear mutually offset and their maximums and minimums are mutually suppressed. This increases the safety against detection of false targets.

11 Claims, 3 Drawing Sheets

RADAR ANTENNA ARRAY

BACKGROUND INFORMATION

To determine the speed and distance of objects in road traffic, it is conventional to use pulsed radar systems (PCT International Patent Publication No. WO 99/42856). It is known from German Patent Application No. DE 44 12 77 that overlapping antenna lobes may be produced for an automotive distance warning radar; the radar lobes may also be directed. Either an exciter system is used as the transceiver antenna there or separate transmitting and receiving antennas are provided.

PCT International Patent Publication No. WO 02/15334 describes a multiple beam antenna array having a beam forming network and a beam combining network. Measures are implemented there so that the transmitting and receiving lobes point in exactly the same direction.

SUMMARY OF THE INVENTION

According to the present invention, using two different antennas for transmitting and receiving, and designing the antenna characteristics of the two antennas so that their dominant secondary lobes are mutually offset, and in particular their maximums and minimums are mutually suppressed, it is possible to mask out false targets outside of the primary lobe, which thus greatly improves the reliability in detection of useful targets.

The present invention is based essentially on the finding that all antenna configurations have secondary lobes of varying strengths, which may be influenced mutually by the triggering, e.g., phase triggering of the individual exciters (patches) or by a special geometric arrangement, although they cannot be suppressed completely. Even if it were possible to suppress one or more secondary lobes, a component that could not be compensated and could simulate false targets would always remain.

Using the measures of the present invention, it is possible to configure the unavoidable secondary lobes at least with respect to their dominant components so that the maximums and minimums in particular are superimposed. If the transmitting antenna emits energy in a dominant secondary lobe toward a large target, then the receiving antenna will have its minimum precisely at this location and will receive little or no energy from the same direction.

In particular by evaluating different reception signals, it is possible to better verify or evaluate the target situation, i.e., in particular to recognize a large target in a secondary lobe.

DETAILED DESCRIPTION

Figure 1:
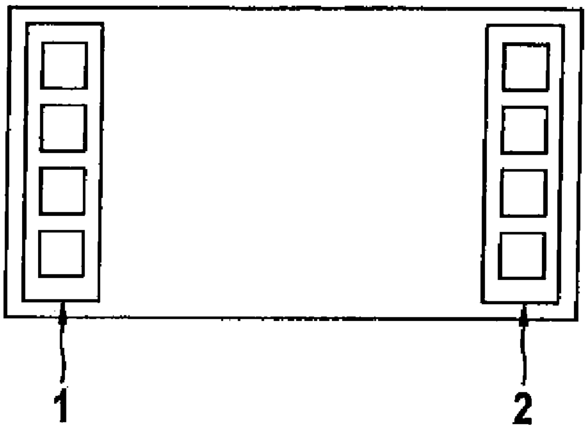
Fig. 1 PRIOR ART
FIG. 1 shows a known antenna array having separate transmitting and receiving antennas.
Figure 2:
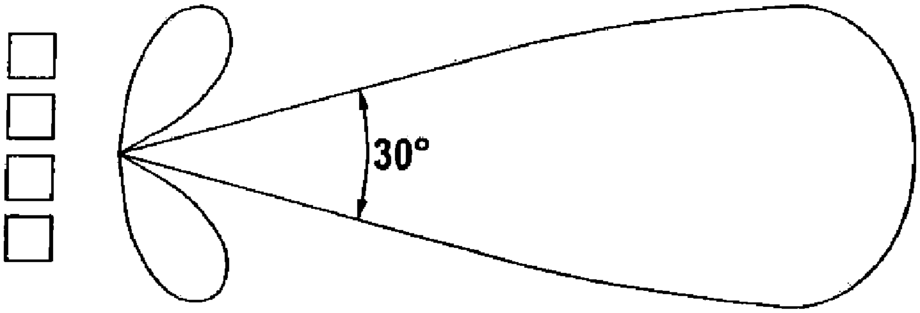
FIG. 2 shows the respective antenna characteristic.
Figure 3:
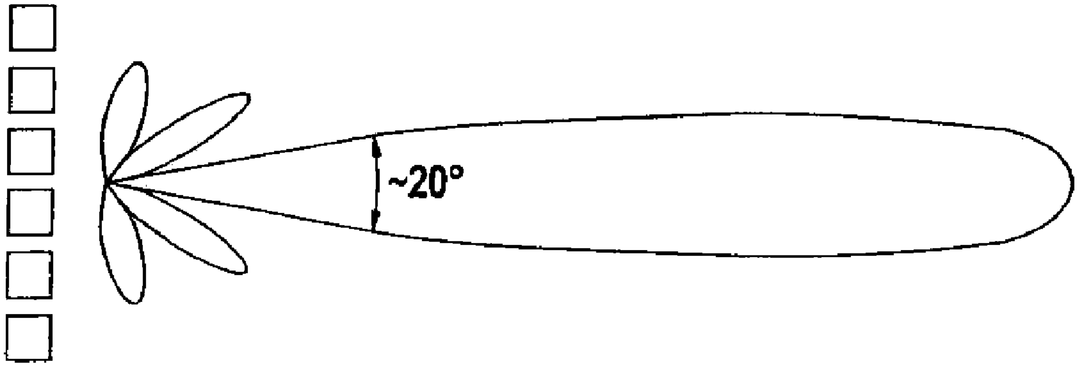
FIG. 3 shows an antenna characteristic having six individual exciters per column.

FIG. 1 shows a known antenna array having one column 1 of four patch exciters for transmitting and a separate column 2 of four patch exciters for receiving. A single patch exciter has a beam angle of approximately 90°. If a plurality of patch exciters, e.g., four as in the present case, are arranged in a column, the vertical beam angle (elevation) is reduced with the number of antenna elements. Using the four patch exciters according to FIG. 1, a vertical beam angle of 30° is achieved. In the horizontal direction (azimuth) nothing changes in comparison with a single exciter, i.e., the beam angle is 90°. By increasing the number of individual exciters per column, the vertical beam angle may be further reduced, although that does not necessarily mean that the separation of targets is better because the unavoidable secondary lobes may simulate false targets. FIG. 2 shows the antenna characteristic of a patch antenna having four individual exciters in one column, and FIG. 3 shows an antenna characteristic of a patch antenna having six individual exciters. As FIG. 3 shows, although the bundling and antenna gain are increased, the number of secondary lobes also increases.

Figure 5:
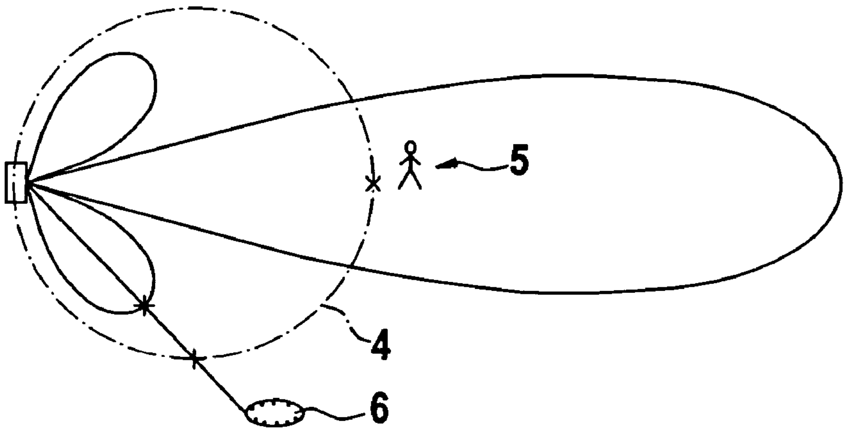
FIG. 5 shows the respective antenna characteristics.

The following situation may be used for illustration:

A very small target (pedestrian 5) is in the primary lobe, exactly where it should be detected, and a very large target (manhole cover 6 or metal in/on the road surface) is detected in the secondary lobe. A radar system cannot differentiate between these targets and might fail to recognize pedestrian 5 (FIG. 5). However, secondary lobes may be suppressed only to a certain extent.

There is a technical approach for recognizing this problem. A guard channel may be provided at the reception end, i.e., another receiving antenna in particular having a different antenna characteristic, e.g., another patch exciter 3 having a 90° elevation angle, to evaluate the target situation using another antenna characteristic (4 in FIG. 5). In addition, both signals are detected with a different power weighting. Pedestrian 5 in FIG. 5 is in the primary lobe. The lower secondary lobe receives reflection from manhole cover 6. Expanded signal processing is capable of evaluating the target situation and deducing that there is a large target in secondary lobe 4. However, this embodiment is associated with increased complexity and requires an additional reception channel.

According to the present invention, an improvement is achieved by suppressing the targets outside of the primary lobe. Two different antennas are used for transmitting and receiving and the unavoidable secondary lobes of these two antennas are offset from one another so that the maximums and minimums overlap precisely and are mutually suppressed, cancelling one another out in the ideal case. When the transmitting antenna emits power in the secondary lobe toward a large target, the receiving antenna has its minimum at this point and receives little or no power from the same direction.

Figure 6:
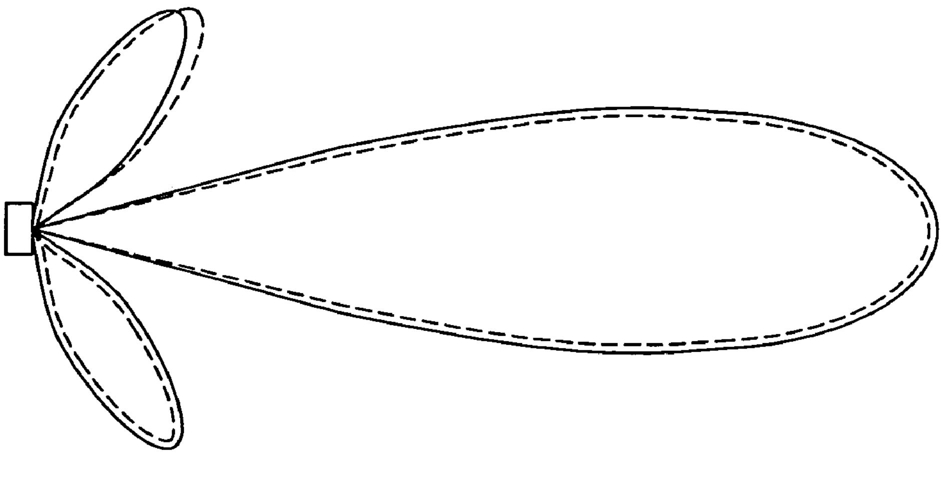
FIG. 6 shows the same antenna characteristics for transmitting and receiving antennas.

FIG. 6 shows the antenna characteristics of a transmitting antenna and a receiving antenna which are identical (solid lines and dashed lines for the two antennas, respectively).

Figure 7:
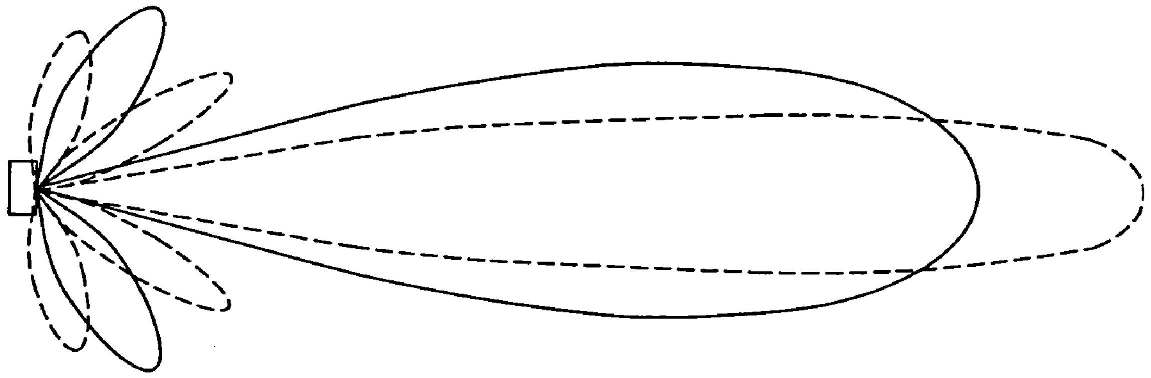
FIG. 7 shows antenna characteristics for transmitting and receiving antennas having obliteration of the secondary lobes.
Figure 8:
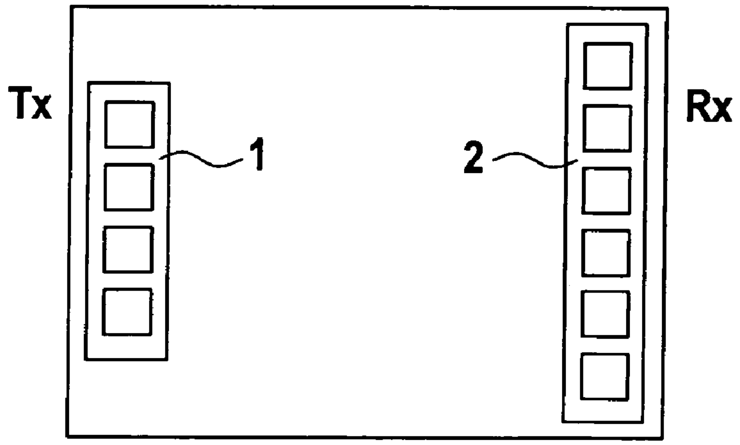
FIG. 8 shows an exciter arrangement for implementation of the antenna characteristics according to FIG. 7.

FIG. 7 shows the antenna characteristics of a transmitting antenna (solid line) and a receiving antenna (dashed line) having the obliteration of the dominant secondary lobes according to the present invention. One possible implementation of such an antenna array according to the present invention is depicted in FIG. 8. The transmitting antenna has a column of four patch exciters and the receiving antenna has a column of six patch exciters. This results in sharper bundling for the receiving antenna due to the increased number of antenna exciters. Obliteration of dominant secondary lobes according to the present invention is achievable not only through a special geometric arrangement as in FIG. 8 but also through a specific phase control, e.g., via propagation time elements for some of the patch exciters.

Figure 4:
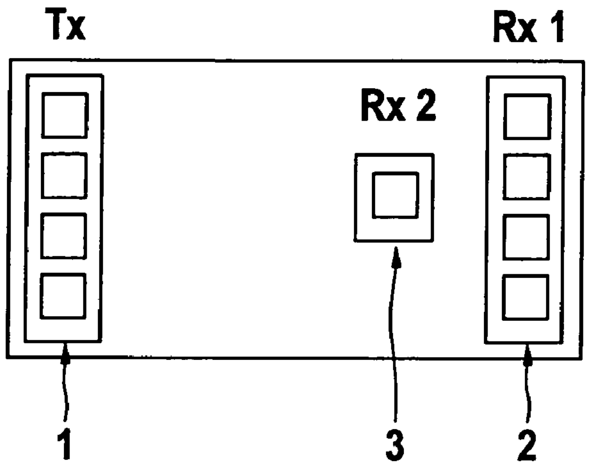
FIG. 4 shows an antenna array having a guard channel.

To further improve the suppression of secondary lobes, although with somewhat greater complexity, the measures according to FIG. 4 (additional antenna exciters having different antenna characteristics as a guard channel) may also be used.

For mutual suppression of the dominant secondary lobes, lobe forming networks, e.g., Rotman lens or Butler matrix, may be used.

If the offset in the secondary lobes is determined by the direction but complete obliteration is not achieved by superpositioning due to differences in amplitude (differences in gain), amplitude compensation of the secondary lobe signals may be performed via a weighting device.

What is claimed is:

1. A radar antenna array comprising:

two different antenna arrangements, a first one of the antenna arrangements having a first group of patch exciters for transmitting and a second one of the antenna arrangements having a second group of patch exciters for receiving, the two antenna arrangements being configured to generate, via the first group of patch exciters and the second group of patch exciters, antenna power emissions having dominant secondary lobes which are mutually offset so as to have the effect that if the first one of the antennas is transmitting and emits power in its secondary lobe towards a target, the second one of the antennas that is receiving has its minimum lobe if the first one of the antennas is transmitting and emits power in its secondary lobe towards the target and the second one of the antennas receives substantially no power from the direction of the target, so that the first one of the antennas that is transmitting and the second one of the antennas that is receiving point in the direction of the target in view of their antenna characteristics.

2. The radar antenna array according to claim 1, wherein the radar antenna array is in an automotive vehicle.

3. The radar antenna array according to claim 1, wherein the antenna characteristics of the two antenna arrangements are such that their dominant secondary lobes are mutually offset and their maximum and minimum lobes are mutually suppressed.

4. The radar antenna array according to claim 1, further comprising an additional receiving antenna arrangement, having a different antenna characteristic, for evaluating a target situation by superimposing two receiving antenna characteristics, to detect a large target in a secondary lobe.

5. The radar antenna array according to claim 1, wherein the antenna arrangements include four patch exciters for the transmitting and six patch exciters for the receiving so as to increase a number of the secondary lobes.

6. The radar antenna according to claim 5, further comprising:

another receiving antenna providing a guard channel having a different antenna characteristic provided by another patch exciter having a 90 degree elevation angle.

7. The radar antenna array according to claim 1, further comprising beam forming networks for mutual suppression of the dominant secondary lobes.

8. The radar antenna array according to claim 1, further comprising antenna columns having individual patch exciters provided for the antenna arrangements.

9. The radar antenna array according to claim 1, further comprising a weighting device for amplitude compensation of secondary lobe signals to mutually offset the dominant secondary lobes.

10. The radar antenna array according to claim 1, wherein the second one of the antenna arrangements include additional exciters for suppressing secondary lobes.

11. The radar antenna array according to claim 1, further comprising different phase controls of antenna exciters for transmitting and receiving.

* * * * *